United States Patent
Domröse

(10) Patent No.: US 8,170,703 B2
(45) Date of Patent: May 1, 2012

(54) METHOD FOR CONTROLLING A PLURALITY OF PRODUCTION PROCESSES

(75) Inventor: Aldo Domröse, Jüchen (DE)

(73) Assignee: CAE Factory GmbH, Jüchen (DE)

( * ) Notice: Subject to any disclaimer, the term of this patent is extended or adjusted under 35 U.S.C. 154(b) by 265 days.

(21) Appl. No.: 12/605,522

(22) Filed: Oct. 26, 2009

(65) Prior Publication Data

US 2010/0114353 A1    May 6, 2010

Related U.S. Application Data

(60) Provisional application No. 61/108,697, filed on Oct. 27, 2008.

(30) Foreign Application Priority Data

Oct. 27, 2008    (DE) .......................... 10 2008 053 274

(51) Int. Cl.
*G06F 19/00* (2011.01)
(52) U.S. Cl. ...................................... 700/100; 700/108
(58) Field of Classification Search .................... 700/100
See application file for complete search history.

(56) References Cited

U.S. PATENT DOCUMENTS

| | | | | |
|---|---|---|---|---|
| 4,827,423 A * | 5/1989 | Beasley et al. | ................... | 700/96 |
| 5,402,349 A * | 3/1995 | Fujita et al. | ...................... | 700/97 |
| 5,442,561 A * | 8/1995 | Yoshizawa et al. | ........... | 700/100 |
| 5,971,584 A * | 10/1999 | Iriuchijima et al. | ........... | 700/101 |
| 6,662,064 B2 * | 12/2003 | Vollmar et al. | ............... | 700/100 |
| 7,043,321 B2 * | 5/2006 | Ruml et al. | ................... | 700/100 |
| 7,085,614 B1 * | 8/2006 | Gartland et al. | .............. | 700/100 |
| 7,818,081 B2 * | 10/2010 | Overley et al. | ................ | 700/96 |
| 7,881,956 B2 * | 2/2011 | Kenyon et al. | ................ | 705/7.28 |
| 2002/0082737 A1 * | 6/2002 | Amrhein et al. | .............. | 700/108 |
| 2003/0065416 A1 * | 4/2003 | Vollmar et al. | ............... | 700/108 |
| 2006/0190115 A1 * | 8/2006 | Kuschel et al. | ............... | 700/100 |
| 2010/0114353 A1 * | 5/2010 | Domrose | ...................... | 700/100 |

* cited by examiner

*Primary Examiner* — Albert Decady
*Assistant Examiner* — Anthony Whittington
(74) *Attorney, Agent, or Firm* — Henry M. Feiereisen; Ursula B. Day

(57) ABSTRACT

A method for controlling a plurality of production processes performed on a plurality of production machines is described, wherein order data regarding the production processes to be performed are inputted in a control unit which generates control instructions for the production machines, wherein state data indicating the state of the individual production machines are taken into consideration when generating the control instructions.

10 Claims, 2 Drawing Sheets

METHOD FOR CONTROLLING A PLURALITY OF PRODUCTION PROCESSES

Figure 1:
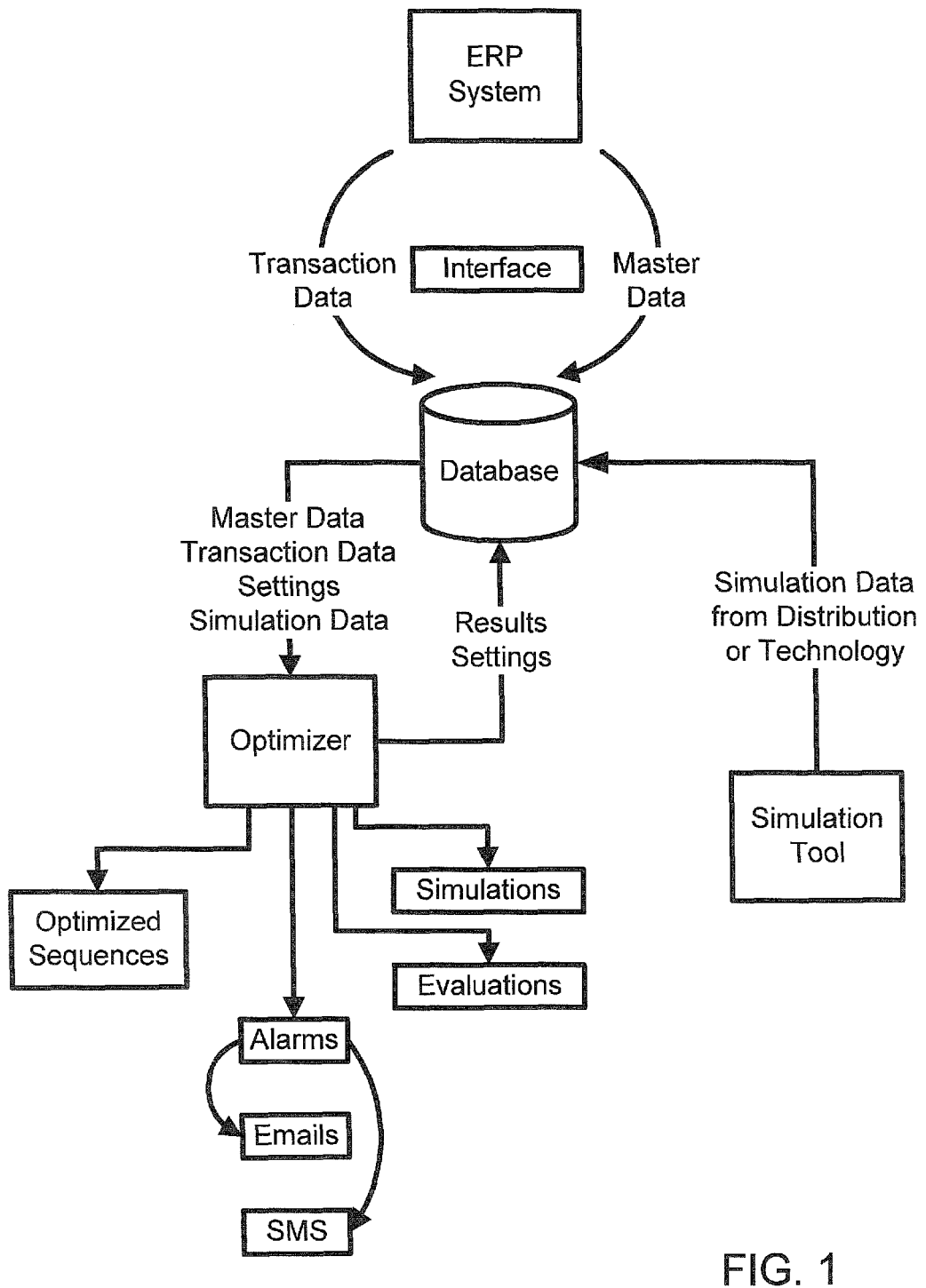

The invention relates to a method for controlling production processes performed on a plurality of production machines.

Such methods are known in the art. Frequently, for performing such methods, disposition systems are used which produce a scheduling plan for the individual production machines based on order data, in particular data relating to the type and quantity of the articles to be worked on in the individual production processes. The scheduling plan defines the time and the production machines on which of the articles will be worked on. The role of a target function for generating the scheduling plan is to always attain the best possible utilization for the existing production machines. Defining this target function is based on the assumption that with the best possible machine utilization also achieves the best possible economical efficiency of the production processes to be performed. Conventional disposition methods therefore perform a purely additive capacity planning.

Conventional methods for controlling a plurality of production processes have the significant disadvantage that the control instructions, which are typically placed in a scheduling plan for the individual production machines, must be generated before the individual production processes are carried out. Consequently, in the event of unplanned events, for example high-priority orders, a new scheduling plan must be generated which takes into account all production processes that still must be performed. Depending on the complexity of the individual production processes and the size of production facility, this may take several hours.

To remedy this situation, U.S. Pat. No. 7,043,321 B2 proposes to provide in a multi-stage production process for producing products a function for quality checks of the individual production steps, which allows interruption of the multi-stage production process, as soon as one of the production steps fails to produce the required quality. With the method disclosed in U.S. Pat. No. 7,043,321 B2, production-related exceptions can advantageously be very quickly identified and the multi-step production process can consequently be interrupted until a new scheduling plan is generated. Although the method disclosed in U.S. Pat. No. 7,043,321 B2 is able to shorten the time until it is recognized that the new scheduling plan is required, this method does not affect the time required to generate a new scheduling plan.

Based on this state of the technology, it is an object of the invention to provide an improved method for controlling a plurality of production processes performed on a plurality of production machines. More particularly, the method should make it feasible to perform the scheduled tasks more economically and also improve flexibility to react to exceptions that occur during ongoing production processes.

This object is attained by the subject matter recited in the independent claims. Advantageous embodiments of the invention are recited in the dependent claims as well as in the following description of the invention.

The core of the invention provides that in a method for controlling a plurality of production processes which are performed on a plurality of production machines, the production processes to be performed do not only take into consideration the order data so as to generate therefrom control instructions for the production machines, but additionally also take into account, as directly as possible, i.e., before the individual production processes are carried out, the state of the individual production machines and introduce these state data when generating the control instructions.

Unlike the method disclosed in U.S. Pat. No. 7,043,321 B2, the method of the invention is intended to anticipate exceptions that may occur during the production processes as far ahead as possible before the individual production processes are started, and to consider these directly when generating the control instructions for the production machines, which can be presented, for example, in form of a scheduling plan.

In principle, all relevant state data of the individual production machines that are relevant for the production processes can and should be considered. This may include, in particular, the respective mode of the individual production machines. According to the invention, this includes the setup or changeover state of a production machine which, with a changeover, can be used for the production of different articles. In mode A, the production machine is used for producing an article X, whereas in mode B, the production machine can be used to work on an article Y. In order to get from mode A to mode B of the respective production machine, a freely selectable changeover process may be required.

Another important group of state data, which according to the invention may be considered for the generation of control instructions, may be production process sequences. This refers to the concrete sequence of individual production steps for carrying out a multi-stage production process on individual production machines for working on an article.

In addition, state data may represent the transport data relating to the required resources for a transporting the articles to be worked on in the respective production processes.

Moreover, the state data can also take into consideration the availability of the production machines.

Moreover, actual production know-how may be stored in data form and taken into account when generating the control instructions.

Regarding the order data, which can be considered when generating the control instructions for the production machines, the type and quantity of the articles to be worked on in the respective production processes, limitations of the respective production processes, the inventory of the parts required for the respective production processes, the sequential order of the processing steps required for performing to respective production processes, as well as an evaluation of the originator of the respective production processes and/or of the articles to be worked on must be taken into consideration.

In a preferred embodiment of the present invention, the control instructions for the individual production machines are generated by first generating initial control instructions which are subsequently improved step-by-step. This can be done, for example, by using preferably a tabu search algorithm, which is known in the art.

In another preferred embodiment of the method of the invention, a distinction is made in the target function used for generating the control instruction depending if the production machines are anticipated to be underutilized or overutilized. If the machines are underutilized, the target function is set to process all production processes with the lowest possible production costs, which includes in particular the changeover costs. If the machines are overutilized, the target function is set to process all production processes with the lowest possible costs for missed deadlines.

Advantageously, computing the costs for missed deadlines may take into account the total costs obtained by adding the individual costs for the individual missed schedules, inventory and the required changeover processes.

The method of the invention can preferably be implemented as a control circuit, i.e., changes in the order data and state data can be processed also during ongoing production processes, so that the control instructions can be continuously adapted. However, to prevent a too frequent generation of new control instructions, a time buffer may be provided whereby the control instructions are adapted, for example, only after a defined time interval or a defined number of changes in the order data and/or the state data.

A production facility according to the invention, in which the method of the invention can be carried out, includes a plurality of production machines and a control unit. The control unit is used to generate control instructions for the individual production machines based on the order data inputted into the control unit, and based on state data relating to the state of the individual production machines, which are transmitted to the control unit by way of suitable means.

Preferably, the production machines in the production facility according to the invention may be controlled automatically based on the generated control instructions. To this end, corresponding interfaces can be provided. Alternatively, corresponding control instructions can be outputted in machine-readable form, for example in form of a barcode. It will be understood, that the production machines can also be controlled manually with the control instructions; to this end, the control instructions should be outputted in human-readable form.

The invention further includes a computer program product with a computer program, which has software means for executing a method according to the invention, as defined in method claims 1 to 8, when the computer program is executed in an automation system.

Figure 2:
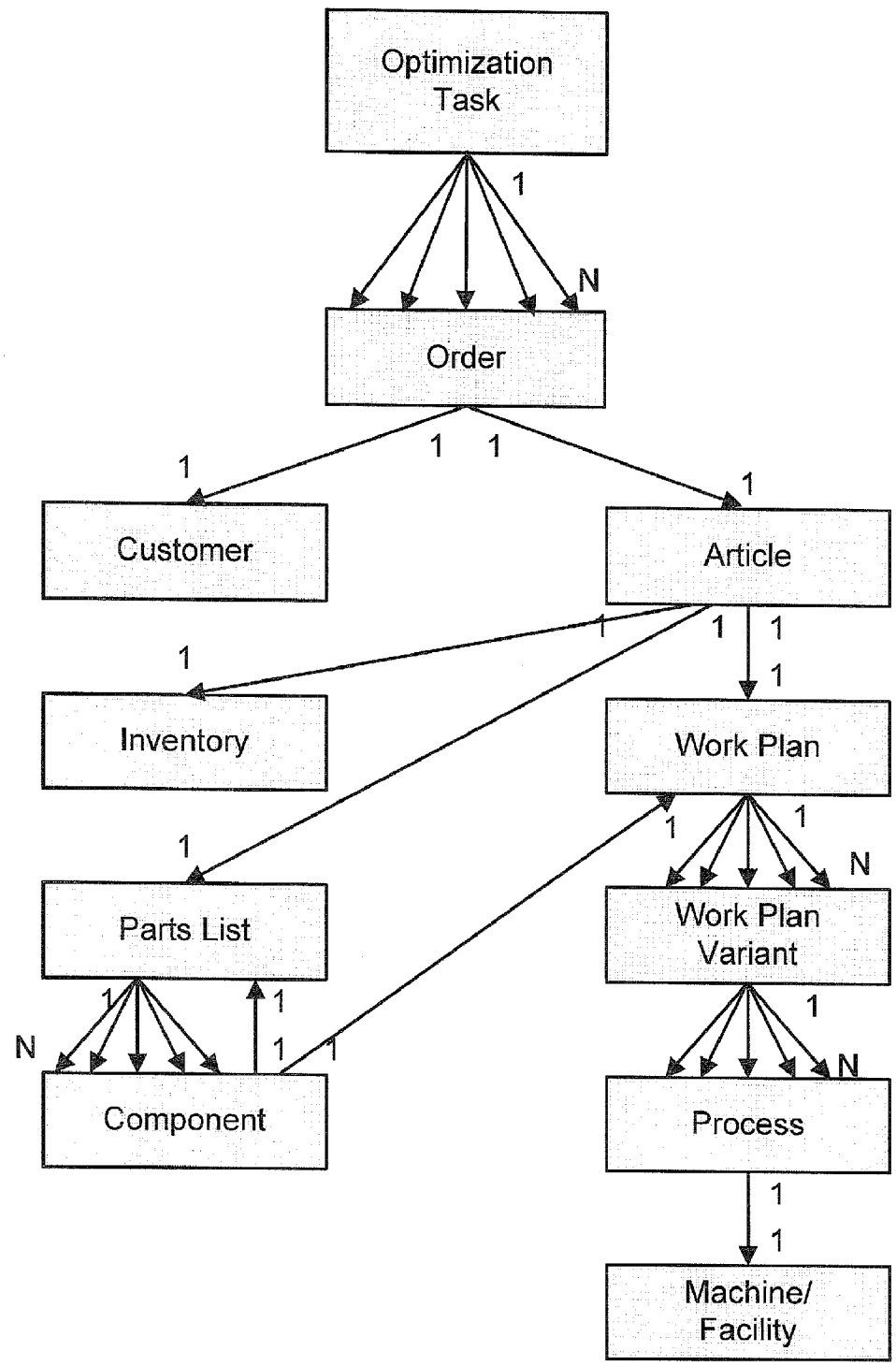

The invention will now be described in more detail with reference to exemplary embodiments illustrated in the drawings. The drawings show in:

FIG. 1 in a schematic diagram, the functionality of a control unit of a production facility according to the invention; and FIG. 2 in a schematic diagram, the process flow of an optimization calculation in conjunction with the method of the invention.

It is an object of the invention to represent one-step or multi-step production processes as realistically as possible and to optimize these processes by taking into account multiple, possibly partially contradictory, goals within the shortest possible time. As a prerequisite, an exact representation of the production machine used in the production processes as well of the articles to be worked on, including all relevant limitations, must be provided. The production machines, the articles and the production processes can best be represented by object-oriented programming languages, which are capable of realistically modeling all details of an actual situation.

In the following, a generalized model for representing production processes is described with almost all production processes, optionally including corresponding extensions, be represented. The affected objects (production machines, articles and production processes) are hereby managed in special lists and data structures which are optimized to use as little memory capacity as possible, so that the control unit of the production facility can access these data exclusively in the working memory of the control unit, which typically results in very short computing times.

The optimization calculation itself is performed by using an adapted tabu search algorithm, wherein first an initial solution is obtained which is adapted, i.e., improved, step-by-step in one or more subsequent steps. Neighborhoods are defined which indicate how new solutions can be generated. These are evaluated and then used further by the algorithm.

Criteria for evaluating solutions may be delivery dates, machine utilization, supplier's reliability, delays, and order, article and customer evaluations.

Solutions which do not satisfy all limitations may also be allowed when calculating the optimization. Such limitation may be, for example, when individual delivery dates are not adhered to, because too many orders were accepted that exceeded the existing production capacity. In this situation, the method of the invention attempts to attain the best possible outcome which may optionally also involve limiting the overall damage.

Disposition systems known in the art take typically several hours for calculating control instructions for the individual production machines, which may be present, for example, in form of a transaction plan, which makes them unsuitable for new short-term planning. With the method of the invention, corresponding control instructions can be determined on a commercially available PC within one to two minutes, allowing an immediate and comprehensive reaction to changing situations.

A situation may change, in particular, when allowing for rush orders. In this case, articles must be processed as quickly as possible outside the existing planning, for example, to prevent expensive shutdowns of the production lines of automobile manufacturers. Based on the method of the invention, a new scheduling plan should be generated as quickly as possible, which determines how the individual production steps for working on the corresponding article can be performed as quickly as possible, taking into account all limitations. The affected production machines may be in a state (mode) which prevents working on these particular articles over a certain time. In spite of such limitations, a suitable solution must be provided, which the method of the invention is able to accomplish.

Unlike in the state-of-the-art, the method of the invention does not employ linear programming, which attempts to obtain results using matrices, to represent the optimization processes as realistically as possible. Such linear programming is time-consuming and is able to only partially consider limitations. Because not all limitations can be considered, the conventional methods are suitable only for capacity planning and not for directly generating control instructions; these must be planned manually. In contrast, the method of the invention defines in detail the location and time where an order will be worked on. A scheduling plan is generated for each production machine which defines the sequential order of the processes including processing times and setup times. According to the invention, the state of the facility is considered and included in the planning. For example, sequences of articles can be excluded based on relationships defined by the users of the method, and tool wear of individual production machines can also be taken into account. In addition, criteria can be defined according to which the generated control instructions are evaluated. For example, a value (e.g., an A, B, C, D value) can be assigned to the individual customers (i.e., the customer for the respective article), and a potentially unavoidable breach of delivery dates can be weighted based on this valuation. For example, a delay of an order for a less important customer can be tolerated more easily than for an important customer. On the other hand, a rush order for a customer of lesser importance may be favored, if the consequences resulting from a missed deadline (for example shutdown of the production line of an automobile manufacturer) are deemed to be disproportionate.

The optimization algorithm used with the invention operates quite efficiently with the underlying data model. The valuation criteria may influence the target function value, so that several results can be produced which more likely correspond to the corresponding requirements.

FIG. 1 shows a control unit for use with a production facility according to the invention. The control unit includes a database and a so-called ERP system (ERP: Enterprise Resource Planning). The database is supplied by the ERP system via an interface with order data relating to the production processes to be performed. The order data include both master data and transaction data. The database provides an optimization unit (Optimizer) with order data as well as corresponding settings and simulation data which are used as a basis for computing simulations, evaluations and optimized scheduling sequences for the individual production machines. The results generated by the optimization unit are used to generate control instructions for the production machines and are also written back to the database, where they can be used as an initial solution for subsequent calculations.

Deficiencies observed during the optimization calculation can be used to generate alarm signals which can be transmitted to responsible parties, for example as an e-mail or SMS, so that these parties can intervene in the processes early on. Data (simulation data relating to the distribution or the technology) for simulating technical or distribution-related scenarios can be supplied to the system by way of a simulation tool.

FIG. 2 shows schematically the relationships used for calculating the control instructions in a method of the invention.

The optimization task involves planning a plurality of orders so that the predetermined goals are optimally achieved.

Each order consists of a customer, an article, a quantity and a quantity unit. A delivery date is associated with each order, whereby an order need not necessarily be associated with a customer. Weighting of the individual customers can be relevant for the result, but need not be proper in all cases. Relevant information that describes the individual orders may be the order number, an article identifier, the quantity, the quantity unit, the respective customer (contracting entity) as well as the corresponding delivery date.

The information about the customer in the system is basically for information purposes. A valuation of the customer (e.g., A, B, C, or D customer) can enter in the target function for the computation. Relevant information regarding the customer is the customer number and its valuation (e.g., A, B, C, or D customer). Additional information can be information about the company, the address, a contact person, an e-mail address, the Internet address, telephone numbers and business volume with the client.

The articles to be worked on can consist of one or several components. This can be evident from a parts list. Relevant order data, which are obtained from the articles to be worked on, can be the article number, the list with attributes of the articles (including an attribute identifier and an associated value), and optionally a parts list number. Additional information can be derived from the contracting entity of the individual articles (customers), the article identifiers as well as descriptions of the articles.

An inventory can be associated with each article and optionally with each component of the individual articles. Withdrawals from the inventory can be made based on the orders, so that articles and components in inventory are not committed multiple times. If an order is canceled, the withdrawn inventory can be released and be available for other orders.

A parts list can be associated with each article, in which the corresponding components and the corresponding item quantities of these components are listed. Relevant order data derived from the parts lists, which may be considered in the method of the invention, are the parts list number and the list of the individual components, including the component number and the corresponding item quantity.

As mentioned above, a component is part of an article. Because components can also include other components, a parts list can be associated with each component. Corresponding relevant order data may be the component number, a list with attributes (attribute identifier and value) and optionally a parts list number. In addition, according to the invention, the component identifier and a description can be considered for the order data.

The processing steps for each article are defined in the work plan. Several different variants for working on an article may exist (work plan variants). Relevant work-plan-related order data may be the work plan number as well as the list with work plan variants.

A work plan variant consists of an ordered list of processes required for working on an article. Relevant order data can be the work plan variant number as well as a list with numerically sorted processes.

A process describes a single processing step. This may relate to an article or one or several components of the article. If several components are combined, then the corresponding parts list for the article of the component is referenced. Relevant order data resulting from the processes can be the process number, a parts list, the production machine(s) suitable for the work as well as the information identifying the components to be worked on during the work cycle. In addition, the order data may include a description of the processing steps. According to the invention, the description of the process may also already include state data. In particular, this includes the corresponding mode of the production machines defined in the order data for the corresponding processes.

When taking into account the object "machine" in the computation, state data are considered and used for generating the control instructions. The essential machine-related state data are obtained, on one hand, from a time availability of the machine and, on the other hand, from a technical availability of the machine. The time availability of the production machines must be determined so that orders can be realistically planned. The following state data may be included in the optimization: the daily availability of operating personnel, holidays, vacation closedowns, special provisions, scheduled maintenance and personnel constraints (resulting, for example, if only certain persons are capable of/authorized to operate the corresponding production machines).

Possible setup times required to changing a production machine working on a first product to performing work on a second product can also be relevant for the time availability. In addition, buffers may be arranged upstream or downstream of individual or all production machines, which are not allowed to be run over during production. Relevant, machine-related information can be the machine identifiers, the time availability, the machine utilization (for example expressed as a percentage), corresponding changeover times, buffers, machine attributes and optionally a machine designation. With respect to the technical availability of the production machines, it may need to be taken into account if a defined production machine is suitable only for working on a first article, and not on a different, second article.

The availability of the individual production machines can be derived from the plant calendar and the shift schedule of the facility, whereby these times can be manually overruled.

A list of attributes ($M_{ij}$) can be associated with each machine ($M_i$), with the list determining if a production process ($J_{kl}$) of an order ($O_k$) can be manufactured on this machine at a certain time (t). The attributes ($M_{ij}$) change in the course of the production process and affect the quantity of the possible production processes that can be manufactured at the next possible point in time.

The computation used to generate the control instructions for the production machines is based on minimizing the costs resulting from the total of missed deadlines, costs for inventory and costs for changeovers:

$$\text{Min} \sum_{i=O_{min}}^{O_{max}} (L(O_i) + WIP(O_i) + SC(O_i))$$

wherein
$O_i$: the order i ("order");
L: the costs for missed deadlines ("lateness");
WIP: the costs for inventory ("work in progress");
SC: the costs for setup ("setup costs").

Missed deadlines are defined as the number of days after the agreed delivery date for finishing the order. The costs for the missed deadlines $L_i$ are composed of a basic value $L_{OFF}$ which automatically occurs for a missed deadline and a variable value $L_D \times D_L$, which is the product of the costs per day ($L_D$) and the number of days $D_L$ of the delay. The costs $L_{OFF}$ and $L_D$ can be defined depending on the customers and the articles.

The costs for the inventory (WIP) are determined from the sum of the corresponding costs for the individual components of an article, starting with the first processing step in the process until the delivery date of the corresponding order, weighted with a corresponding value. The costs for an article are obtained by adding the costs for the required components, multiplied by the number of days prior to the delivery date ($D_D$).

The costs for the changeover processes (SC) are the sum of the costs for changing over a production machine, which is set up for working on an article A, to working on an article B, as well as other changeover costs which may be caused by changes of tools or material. The changeover costs do not affect the throughput time of the orders.

The invention claimed is:

1. A method for controlling a plurality of production processes performed on a plurality of production machines, comprising the steps of:
   inputting order data relating to the production processes in a control unit, and
   generating with the control unit control instructions for the production machines with a target function selected such that all production processes have lowest possible production costs,
   wherein state data relating to a state of the individual production machines are taken into consideration when generating the control instructions.

2. The method of claim 1, wherein the order data comprise one or more of the following information:
   type and quantity of articles to be worked on in the production processes;
   limitations affecting the production processes;
   inventory of products required for performing the production processes;
   sequential order of processing steps required for performing the production processes;
   valuation of customers associated with the production processes.

3. The method of claim 1, wherein the state data comprise one on more of the following information:
   modes of individual production machines;
   production process sequences;
   transport data relating to resources for transporting an article to be worked on in the production processes;
   availability of the production machines.

4. The method of claim 3, wherein generating the control instructions includes generating initial control instructions first, and subsequently improving the initial control instructions step-by-step.

5. The method of claim 3, wherein the improved control instructions are generated using a tabu search algorithm.

6. The method of claim 1, wherein if production machines are overutilized, the target function for generating the control instructions is selected such that all production processes have lowest possible costs for missed deadlines.

7. The method according to claim 6, wherein the lowest total costs are is obtained by adding individual costs for the missed deadlines, inventory, and required setup processes.

8. A production facility comprising:
   a plurality of production machines, each production machine having state data indicating a state of the production machine,
   a control unit generating control instructions for the plurality of production machines performing a plurality of production processes based on order data inputted in the control unit and a target function selected such that all production processes have lowest possible production costs, and
   means for transmitting the state data to the control unit.

9. The production facility of claim 8, wherein the production machines are automatically controlled based on the control instructions.

10. A computer program product with a computer software program embodied on a non-transitory computer-readable medium, said computer software program, when loaded into computer memory, causing the computer to execute a method for controlling a plurality of production processes performed on a plurality of production machines, with the steps of:
   inputting order data relating to the production processes in a control unit, and
   generating with the control unit control instructions for the production machines with a target function selected such that all production processes have lowest possible production costs,
   wherein state data relating to a state of the individual production machines are taken into consideration when generating the control instructions.

* * * * *